Feb. 23, 1954
C. C. AUTON
2,669,765
INTERNAL CIRCULAR CLIPPING AND
INSPECTION DEVICE FOR HOSIERY
Filed April 18, 1952
3 Sheets-Sheet 2
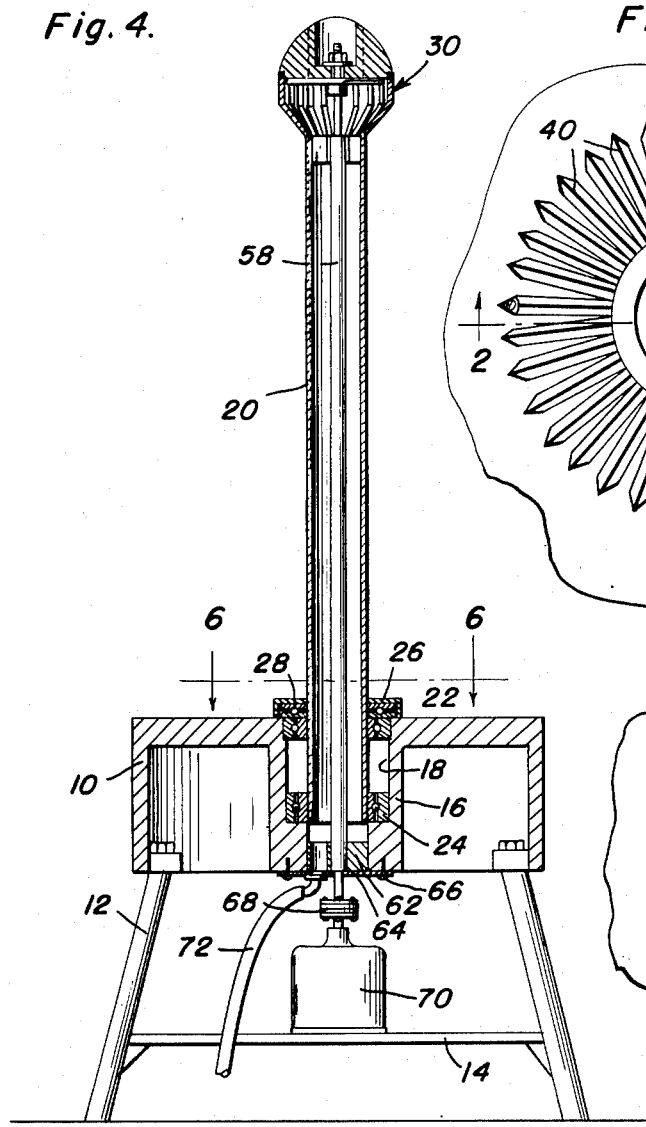
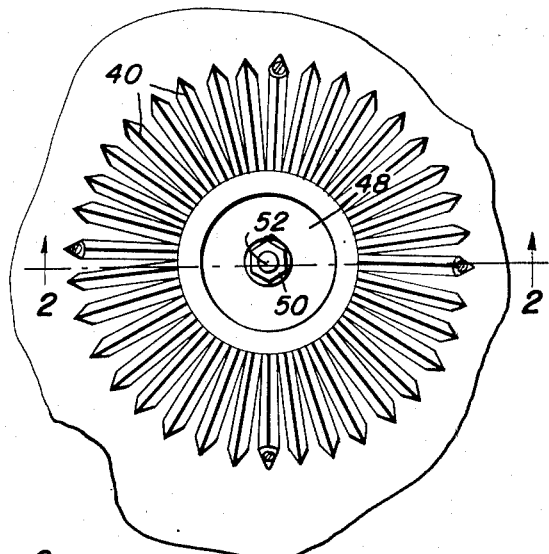
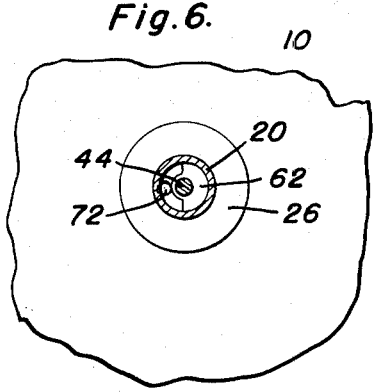
Claud C. Auton
INVENTOR.
BY *Clarence A. O'Brien*
*and Harvey B. Jacobson*
Attorneys Feb. 23, 1954
C. C. AUTON
2,669,765
INTERNAL CIRCULAR CLIPPING AND
INSPECTION DEVICE FOR HOSIERY
Filed April 18, 1952
3 Sheets-Sheet 3
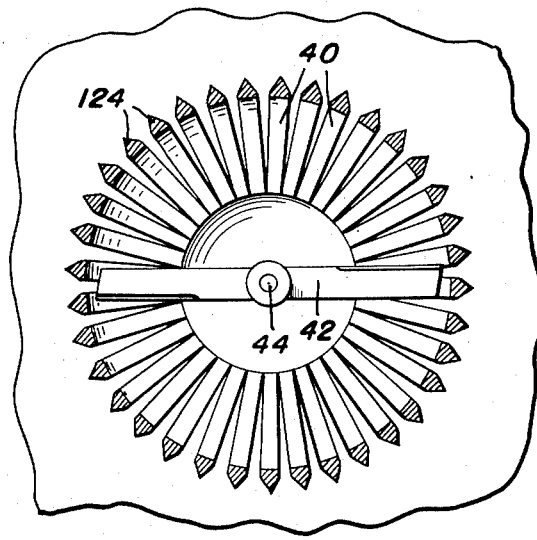
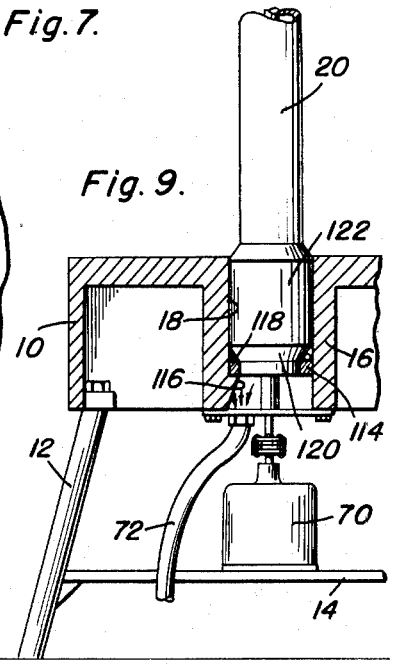
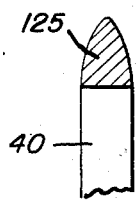
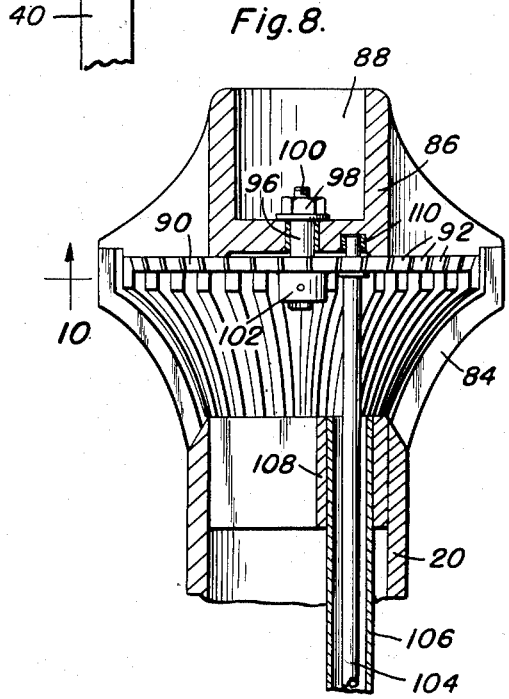
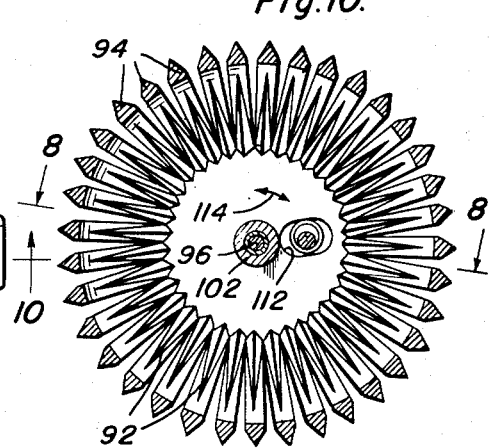
Claud C. Auton
INVENTOR.

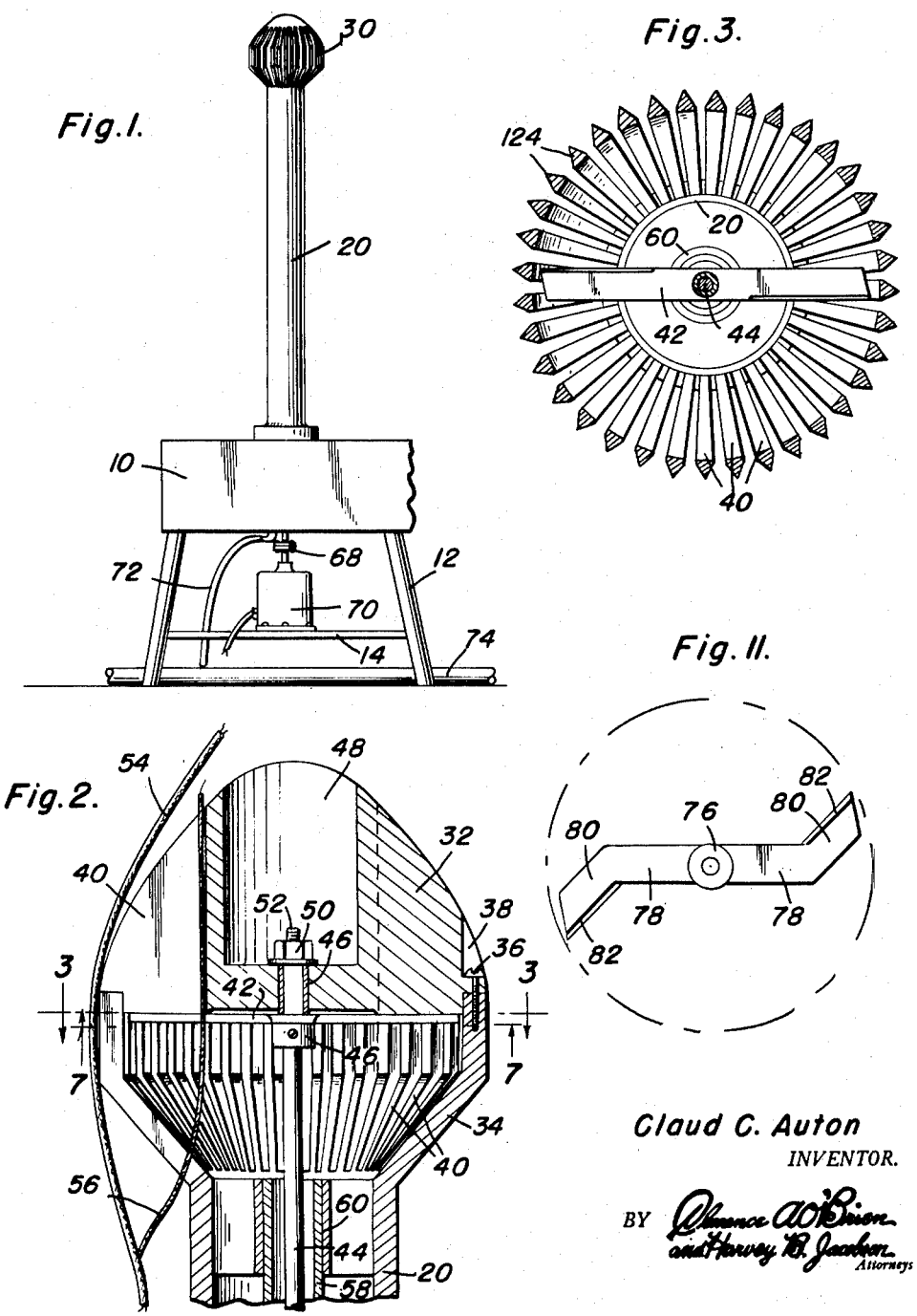

Patented Feb. 23, 1954

2,669,765

UNITED STATES PATENT OFFICE 2,669,765

INTERNAL CIRCULAR CLIPPING AND INSPECTION DEVICE FOR HOSIERY

Claud C. Auton, Maiden, N. C., assignor, by mesne assignments, to Textile Trimming and Boarding Machine Company, Reading, Pa., a corporation of Pennsylvania Application April 18, 1952, Serial No. 283,017

6 Claims. (Cl. 26—11)

1

This invention comprises novel and useful improvements in an internal circular clipping and inspection device for hosiery and more specifically relates to a device which will greatly facilitate the inspection of knitted hosiery after the same has been removed from a knitting machine for determining the quality and defects of the hosiery, and for severing and removing unwanted string ends from the inside of a stocking or sock.

The primary object of this invention is to provide an apparatus which will greatly facilitate the inspection of stockings and socks as the same are removed from seamless hosiery knitting machines.

A further object of the invention is to provide an apparatus in conformity with the preceding object which shall quickly and readily shear the unwanted loose ends of strings and threads from the stockings or socks as the same are received from knitting machines.

Yet another object of the invention is to provide an apparatus in accordance with the foregoing objects which shall automatically remove the severed string ends without requiring the attention of the operator for that purpose, and while permitting the operator of the device to make a thorough inspection of the knitted stocking or sock upon the apparatus.

A more specific object of the invention is to provide an apparatus as set forth in the above mentioned objects which shall be provided with a circular clipping head for automatically shearing and removing the ends of threads and strings from the inside of stockings or socks; and which will at the same time hold the stocking or sock in a position to be readily inspected for defects.

A still further important object of the invention is to provide an apparatus which shall be capable of being mounted in different positions whereby the article being inspected and treated by the device may be preferably held in a vertical position, but may also be disposed in other positions without impairing the operation and utility of the device.

A still further important object of the invention is to provide an apparatus in conformity with the foregoing objects in which the circular clipping head of the same may be readily rotated during the inspection of the stocking or sock without impairing the operation of the head; and whereby a series of clipping heads may be interchangeably employed where desired.

Yet another object of the invention is to provide an apparatus as set forth in the previously mentioned objects which shall be capable of attachment as a plurality of apparatuses to a single

2 suction line whereby the clippings of each apparatus may be automatically and readily disposed of.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a side elevational view of a preferred embodiment of apparatus in accordance with the principles of this invention;

Figure 2 is a fragmentary enlarged view of a portion of the clipping head of the apparatus of Figure 1, the view being taken substantially upon the plane indicated by the section line 2—2 of Figure 5;

Figure 3 is a horizontal sectional detail view, taken substantially upon the plane indicated by the section line 3—3 of Figure 2 and showing further details of construction of the clipping head of Figure 1;

Figure 4 is a vertical central longitudinal sectional view of the apparatus as shown in Figure 1;

Figure 5 is a fragmentary top plan view of the clipping head shown in Figures 1, 2 and 4, but upon an enlarged scale;

Figure 6 is a horizontal sectional detail view taken substantially upon the plane indicated by the section line 6—6 of Figure 4;

Figure 7 is a horizontal sectional view taken substantially upon the plane indicated by the section line 7—7 of Figure 2;

Figure 8 is a view similar to Figure 2, but showing a modified construction of clipper head, and is taken substantially upon the section line 8—8 of Figure 10;

Figure 9 is a fragmentary detail view in vertical section showing a slight modification of the rotatably mounted shaft of the apparatus;

Figure 10 is a horizontal sectional view taken substantially upon the plane indicated by the section line 10—10 of Figure 8 and showing certain mechanical details of the clipper head of Figure 8;

Figure 11 is a plan view showing a modified form of clipper blade forming a part of the invention; and Figure 12 is an enlarged detail sectional view showing the preferred shape of a tooth or groove member of the guard for the cutter head.

Reference is now made more specifically to the accompanying drawings, wherein like numerals designate similar parts throughout the various views.

Referring first to the embodiment illustrated in Figures 1–7, it will be seen that the apparatus consists of a supporting stand or base 10 of any desired character, having suitable supporting legs 12 with a supporting platform 14 therebetween. The top surface of the stand is preferably flat and the same is provided with a depending central portion 16 which may be of a tubular construction having a passage 18 extending therethrough. A replaceable tubular standard 20 is provided and which is rotatably supported in the passage 18 of the central portion of the base as by means of anti-friction bearing assemblies 22 and 24 disposed in that tubular portion as shown in Figure 4. Welded or otherwise attached to the standard 20 is an inverted, cup-shaped flange member 26 which by means of an anti-friction bearing assembly 28 rests upon the top surface of the base 10. By means of this bearing assembly it will thus be apparent that the standard is removably and rotatably supported by the base, the standard being thus journaled for complete rotation about its longitudinal axis.

At its upper end, the standard is provided with a clipper head assembly 30 which is substantially ball-shaped but having a relatively pointed upper end, and constitutes an enlargement upon the upper end of the standard. This clipper head assembly is more particularly shown in Figure 2 and may consist of complementary upper and lower head sections 32 and 34, respectively, which are removably secured to each other as by fastening screws 36 which may be disposed in recessed or cut out portions 38 of the upper section.

It will be observed that the lower section 34 is outwardly and upwardly flaring from the top of the standard 20, while the upper end of the upper section is pointed and curved to provide a smooth downwardly and outwardly flaring surface.

As so far described, it will now be understood that a sock or a stocking as received from a hosiery knitting machine may be disposed over the head portion of the standard whereby the stocking will be distended by the head portion so that the same may be easily inspected to ascertain the perfection and quality of the workmanship upon the stocking. Moreover, once the stocking has been placed upon the head of the standard, the latter may be readily rotated throughout 360 degrees to inspect the stocking from all sides.

The upper and lower sections 32 and 34 are provided with radially extending notches or slots which extend longitudinally of the head and standard. These notches or slots lie between fingers, webs or ridges 40 which are disposed in alignment in the two sections. The lower section is hollow for a purpose which will be later set forth, while the upper section is provided with a flat bottom surface.

Received within the hollow lower section 34 is a cutter 42 which is fixedly secured adjacent the upper end of a driving or connecting shaft 44, the cutter being retained against a collar 46 on the shaft and the flat bottom wall of the upper section 32. The shaft extends through a journal bushing 46 in the upper section and into an axial recess 48, being rotatably retained therein as by a fastening nut 50 on the upper screwthreaded extremity 52 of the shaft. It will thus be seen that the cutter is fixedly secured against axial displacement relative to the bottom wall of the upper section, but is freely rotatably mounted within the hollow head.

The cutter may be of any desired character, and as shown in Figure 3 comprises a blade extending radially in opposite directions from the shaft 44 and into close juxtaposition to the ribs or webs 40 of the notched head.

As so far described, the arrangement is such that when a stocking, a portion of which is shown at 54 in Figure 2, is disposed over the head 30, any loose string ends, one of which is indicated at 56, which lie upon the interior or inside surface of the finished stocking as the latter comes from the knitting machine, will pass into the grooves between the ribs 40 as the stocking is placed over the head, whereby the string ends will pass into the interior of the hollow head and thus will be sheared from the inner surface of the stocking by the rotation of the cutter blade as set forth hereinafter.

It will now be observed that the loose thread ends will be sheared or clipped from the stocking either as the latter is placed upon the head 30 and drawn down about the standard, and/or as the stocking is moved upwardly and off of the head and standard.

It is an important feature of this invention that the shearing or clipping of the loose thread ends of the stocking will be automatically performed as the latter is placed upon or withdrawn from the head and standard, and will in no way interfere with the rotation of the standard and head in order to thoroughly inspect the stocking. Thus, both the clipping operation and the inspection operation can be performed by the same worker and at the same time that the inspection operation is being carried out, thus resulting in a considerable saving of time and labor in the handling of knitting stockings.

Referring now again to Figure 4, it will be seen that there is provided a housing or tubular conduit 58 in which the shaft 44 is journaled in any suitable manner, not shown, the upper end of this housing or tubular member 58 being frictionally retained in a guide sleeve or bushing 60 mounted in the upper end of the standard 20. At its lower end, the housing 58 is received in a bushing member 62 which is supported by a closure plate 64 removably secured as by screws 66 to the bottom wall of the axially extending portion 16 of the support stand 10. The shaft 44, however, extends below this closure plate 64, and is secured by any desired type of detachable drive coupling 68 to the armature of an electric motor 70 or other suitable source of power mounted upon the shelf or platform 14 in the supporting stand 10.

It will thus be apparent as so far described that the operation of the cutter is independent of the rotation of the standard 20.

Means are provided for automatically withdrawing clippings removed from the stocking by the cutter. For this purpose, the conduit 72 which may consist of or which may include a flexible hose if desired, which communicates with the interior of the standard 20 through an opening in the closure plate 64 to which the conduit is attached, the conduit at its other end being connected in any desired manner to a source of suction, not shown, as for example, by a suction pipe 74, see Figure 1. It will be readily understood that a plurality of apparatuses of the character above described may all be attached to the same suction member 74 whereby the clippings or cuttings will be automatically drawn down through the hollow standard and discharged. It will also be observed that this suction will assist in drawing the loose thread ends 56 into the slots between the ribs 40 and thus will facilitate and render more effective the clipping or shearing of the stocking by the apparatus.

I desire to be particularly noted that as illustrated in Figures 1 and 4, the standard 20 is supported in a vertical position upon the supporting stand. The standard may be removed and exchanged for another of a different size or character if desired, by merely lifting the standard upwardly from its support after the coupling 68 has been disconnected. However, although the standard has been illustrated as being mounted in a vertical position, it is evident that the same may be mounted in any desired position which is found to be most convenient in the particular installation or factory in which the device is utilized.

In the form of the apparatus so far described, a continuously rotating cutter blade has been illustrated and described. This blade may consist of a pair of diametrically disposed arms as shown in Figure 3, or alternatively may take the form shown in Figure 11, in which case the blade includes a hub portion 76 having a pair of oppositely and diametrically extending arms 78 extending therefrom, which terminate at their ends in a pair of angularly disposed extremities 80 having cutting edges 82. In some instances this latter form of blade may be preferred to that shown in Figure 3.

However, it should be clearly understood that the principles of this invention are not restricted to a continuously rotating cutter blade. Instead, an oscillating or vibrating type of blade may be utilized, of any desired construction, as for example that illustrated in Figures 8, 9 and 10. In this arrangement, the standard 20 at its upper end is provided with an upwardly and outwardly smoothly curving and flaring head section 84 which is attachably secured to a complementary, reversely shaped upper head section 86. As in the preceding embodiment, the upper head section has an axial well or recess 88 and a bottom surface closely adjacent to which is positioned the rotary cutter 90 in the form of a disk having a plurality of radially disposed cutting teeth 92. These teeth extend into close juxtaposition to the plurality of webs or ribs 94 in the two head sections and between which the thread ends of the sock or stocking may be passed.

The cutter is rotatably mounted upon the upper head section by means of a shaft or axle 96 which extends into the recess 98 and is removably secured to the upper section as by a fastening nut 98 upon the upper screw-threaded portion 100 of the shaft, a collar 102 upon the lower end of the shaft serving to hold the cutter disk to the upper section.

A connecting or driving shaft 104, extending through the housing 106 received within the standard 20 but off-center with respect to the same, is provided, the housing 106 being supported in the upper end of the standard 20 as by means of a bushing or the like 108. The shaft 104 at its lower end is connected to the source of power in the same manner as the shaft 44 and rotates continuously. At its upper end, the shaft 104 is journaled in a suitable bushing or bearing 110 formed in the bottom wall of the upper head section 86, this shaft extending through an elongated slot 112 formed in the cutter disk as shown in Figure 10. A suitable gearing connection of any desired character, not shown, but indicated diagrammatically in Figure 10, whereby continuous rotation of the shaft 104 will serve to impart a limited oscillatory motion to the cutter disk, as indicated by the arrow 114 in Figure 10. Since the actual driving means and driving connection for obtaining the oscillatory motion from a continuously rotating shaft is in itself well known and forms no part of the present invention, a further description and illustration of the same is believed to be unnecessary. It will, however, be now understood that the continuously rotating shaft 104 will continuously oscillate the cutter disk to perform the same functions as the continuously rotating blade 42 or 78 previously described and without impairing the free rotation of the standard during the inspecting operation upon the stocking.

Also, as in the preceding embodiment, the suction means previously described may be employed to remove the shearings or clippings from the interior of the stocking.

It will be observed that while the head 30 of the first embodiment was generally egg-shaped upon its upper portion, and was substantially conical upon its lower portion, the head illustrated in Figure 8 may be concaved upon both its upper and lower sections. Obviously, any desired shape may be utilized, the essential feature being the ability to distend the stocking for inspection, and to cause or permit the thread ends of the stocking to pass into the slots in the head to be clipped or sheared by the cutter therein.

As an alternative to the standard mounting construction of Figure 4, the arrangement of Figure 9 may be utilized. In this latter arrangement, instead of supporting the weight of the standard upon the flange 26 and bearing 28 and by that means upon the upper surface of the stand 10, there may be provided an internal bearing seat 114 resting upon the shoulder of a radial projection 116 within the previously mentioned passage 18 of the stand axial projection 16, which by means of a bearing assembly 118 rotatably supports and receives the conical seat 120 formed on the lower enlarged portion 122 of the standard 20. Thus, the supporting means for the standard is housed within the stand and not disposed upon the upper surface of the same.

It should be here noted, as clearly shown in Figures 3, 5, 7 and 10, that the webs or ribs of the head, and between which lie the slots which receive the thread ends of a stocking, are preferably pointed as at 124. These points which may take the form of beveled edges upon the ribs 40 or 94, guide and facilitate the passage of the thread ends into the interior of the head as the stocking is passed onto or removed from the head and standard. As shown in Figure 12, however, the ribs may be rounded instead of pointed, as at 125.

From the foregoing, it will be apparent that the device illustrated and described hereinbefore enables one person to simultaneously perform the heretofore separate functions of inspecting and clipping a stocking, and reduces the handling required to perform these functions. This not only saves time and labor, but also greatly reduces the physical effort on the part of the operator in the performing of these function and reduces the amount of handling required of the stocking. It will also be appreciated that by this apparatus the thread ends are cut off to a uniform length or are gauged during their clipping, resulting in a more uniform product with less danger of runs or the like which might result from the threads being clipped too closely.

From the foregoing, the construction and operation of the device will be readily understood and further explanation is believed to be unnecessary.

However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. An apparatus for inspecting and shearing hosiery comprising a supporting base, an elongated mandrel for receiving a stocking thereon, means for mounting said mandrel upon said base for complete rotation about the axis of the mandrel, said mandrel having a head for expanding hosiery placed thereover for inspection of the same, said head being hollow and having slots on its periphery for receiving loose ends of hosiery threads as the hosiery is placed over the head, a cutter in said head for shearing the thread ends passing through said slots, means for operating said cutter.

2. An apparatus for inspecting and shearing hosiery comprising a supporting base, an elongated mandrel for receiving a stocking thereon, means for mounting said mandrel upon said base for complete rotation about the axis of the mandrel, said mandrel having a head for expanding hosiery placed thereover for inspection of the same, said head being hollow and having slots on its periphery for receiving loose ends of hosiery threads as the hosiery is placed over the head, a cutter in said head for shearing the thread ends passing through said slots, means for operating said cutter, said operating means including a source of power mounted upon said base, connecting means extending through said mandrel and connecting said source of power to said cutter.

3. An apparatus for inspecting and shearing hosiery comprising a supporting base, an elongated mandrel for receiving a stocking thereon, means for mounting said mandrel upon said base for complete rotation about the axis of the mandrel, said mandrel having a head for expanding hosiery placed thereover for inspection of the same, said head being hollow and having slots on its periphery for receiving loose ends of hosiery threads as the hosiery is placed over the head, a cutter in said head for shearing the thread ends passing through said slots, means for operating said cutter, means connecting a source of suction to the interior of said head for removing clippings sheared by said cutter.

4. An apparatus for inspecting and shearing hosiery comprising a supporting base, an elongated mandrel for receiving a stocking thereon, means for mounting said mandrel upon said base for complete rotation about the axis of the mandrel, said mandrel having a head for expanding hosiery placed thereover for inspection of the same, said head being hollow and having slots on its periphery for receiving loose ends of hosiery threads as the hosiery is placed over the head, a cutter in said head for shearing the thread ends passing through said slots, means for operating said cutter, said head comprising complementary upper and lower sections, said sections having radially arranged and longitudinally extending registering grooves forming said slots.

5. An apparatus for inspecting and shearing hosiery comprising a supporting base, an elongated mandrel for receiving a stocking thereon, means for mounting said mandrel upon said base for complete rotation about the axis of the mandrel, said mandrel having a head for expanding hosiery placed thereover for inspection of the same, said head being hollow and having slots on its periphery for receiving loose ends of hosiery threads as the hosiery is placed over the head, a cutter in said head for shearing the thread ends passing through said slots, means for operating said cutter, said head comprising complementary upper and lower sections, said sections having radially arranged and longitudinally extending registering grooves forming said slots, said operating means including a source of power mounted upon said base and connecting means extending through said mandrel and connecting said source of power to said cutter.

6. A clipper for hosiery comprising a base, a tubular standard journaled on said base for complete rotation about its longitudinal axis, a hollow head on said standard, a cutter in said head, said head having openings in its side for receiving threads from hosiery in which said head and standard are inserted, a shaft in said standard connected to said cutter for rotating the same, means on said base for rotating said shaft, said cutter and head being rotatable independently of each other.

CLAUD C. AUTON.

References Cited in the file of this patent

UNITED STATES PATENTS

| Number | Name | Date |
|---|---|---|
| 594,400 | Hirner | Nov. 30, 1897 |
| 1,090,702 | Firsching | Mar. 17, 1914 |
| 1,190,307 | Leveque | July 11, 1916 |
| 1,622,653 | Leister | Mar. 29, 1927 |
| 1,720,209 | Cunningham | July 9, 1929 |